Patented Aug. 12, 1952

2,606,888

UNITED STATES PATENT OFFICE 2,606,888

MOLDING COMPOSITION, INCLUDING A NOVOLAC, HEXAMETHYLENE TETRAMINE, BORIC ACID AND LIME OR MAGNESIA

James Harold Williams, Edgware, and Terence Ward, West Wickham, England, assignors to Imperial Chemical Industries Limited, a corporation of Great Britain No Drawing. Application March 9, 1948, Serial No. 13,943. In Great Britain March 10, 1947

7 Claims. (Cl. 260—59)

This invention relates to improved thermosetting moulding compositions having as the resin component a two stage phenolformaldehyde resin.

By the expression "phenol formaldehyde moulding compositions" as used hereinafter throughout the specification and the appended claims, we mean filled or unfilled resin compositions in a state of sub-division suitable for feeding into moulds used in the art in which the resin component is a novolac and a methylene-donating hardening agent, the degree of condensation of the resin being such that the composition has a satisfactory "flow" when pressure is applied to it in a hot mould and which can be cured by heat and pressure to the infusible, insoluble stage.

By a "novolac" we mean a fusible, soluble condensation product of formaldehyde with phenol, m-cresol, resorcinol or 3:5-xylenol or commercially available mixtures of these and their isomers in which the molecular ratio of formaldehyde to phenolic compound is not greater than 1:1. These condensation products are normally prepared in the presence of an acid condensation catalyst.

By "methylene-donating hardening agents" we mean substances such as hexamethylene tetramine, paraformaldehyde and the polyoxymethylenes, which provide the additional methylene groups required to convert novolac to the infusible, insoluble state. Hexamethylene tetramine is generally preferred as is well known in the art.

Thermosetting moulding compositions are produced by blending together the resin and the hardening agent and, if desired, one or more fillers, a mould lubricant, which may be for example stearin, a basic material such as lime or magnesia and any other desired ingredients such as plasticisers and dyes and/or pigments, and thereafter malaxating the blend for example in a "Banbury" mixer and/or on heated rolls until the composition has the desired "flow" and the constituents of the blend are well mixed together. The compositions are then converted to a form suitable for loading into moulds or compacting in pelleting machines. Suitable fillers for such compositions include woodflour, paper, cotton in various forms, mica and asbestos. If compositions suitable for the production of high impact strength mouldings are desired, fillers in the form of string or diced fabric may be used. The compositions may then be prepared by mixing the resin, which may be in the form of an aqueous or spirit solution or aqueous suspension and hardening agent with the fillers and other ingredients in a suitable mixer such as an edge runner mill or a Baker Perkins mixer until the fillers are well impregnated with the resin and thereafter drying, heating being continued until the compositions have the required "flow."

Mouldings prepared from phenol-formaldehyde moulding compositions, especially those containing resins made from commercially available mixtures of cresols and xylenols, often suffer from the disadvantages of being slow to cure and being difficult to remove from hot moulds because they tend to be soft at the temperature of the mould. This softness may lead to deformation and damage to the moulding during removal from the mould. The mouldings may also stick to the mould and may even require the use of considerable force in their extraction therefrom. These difficulties, as will be readily appreciated by those skilled in the art, cause a decreased speed of production and increased cost of articles moulded from such compositions.

An object of the present invention is to provide a process for the production of improved phenol-formaldehyde moulding compositions. Another object is to provide a process for the production of phenol-formaldehyde moulding compositions having increased rates of cure. A further object is to provide a process for the production of phenol-formaldehyde moulding compositions having increased plasticity when subjected to moulding conditions. A still further object is to provide a process for the production of phenol-formaldehyde moulding compositions which give mouldings having increased hot strength. Other objects will appear hereinafter.

According to the present invention these objects are accomplished by a process comprising incorporating into a phenol-formaldehyde moulding composition, as hereinbefore defined, a boric acid.

The boric acid is preferably used in amount from 0.1 to 15 per cent by weight of the novolac plus methylene donating agent. Quantities in excess of 15 per cent may be used but unless accompanied by excessive amounts of alkaline earth metal oxide or hydroxide, use of such quantities tends to produce mould poisoning, when unplated moulds are used, causing an apparent decrease of flow to be shown by successive mouldings. The boric acid may be added to the other ingredients in any desired manner, for example, it may be added either in a dry state or in solution to the novolac and the other ingredients. Alternatively, it may be added to the blended material before, during or after malaxation. It is preferred, however, to add the boric acid at an initial blending stage of the novolac resin with the other ingredients as this method is most convenient for plant operation. Boric acid in a pure form such as, for example, orthoboric acid conforming to the standard laid down in the British Pharmacopoeia is preferred because the impure acids often contain compounds which cause adverse effects. Orthoboric acid, $B(OH)_3$, is preferred as being most effective in achieving the objects of this invention.

It is preferred in the production of thermosetting moulding compositions, as is well known in the art, to incorporate an alkali, preferably an alkaline earth metal oxide or hydroxide, as this reduces the tendency of hot moulded articles to stick to the mould. It is preferred that lime or magnesia or equivalent thereof be incorporated into the improved compositions of this invention. When such oxides or hydroxides are used it has been found that as the quantity of alkali present increases it is necessary to increase the amount of modifying acid used. In preferred embodiments of this invention the moulding compositions have incorporated therein 2–6% of lime or magnesia. When 6% of boric acid is used a very suitable amount of lime or magnesia is 2% by weight, these percentages being based on the weight of novolac plus methylene donating agent.

A valuable feature of the present invention is that it allows the use of cresol and/or xylenol mixtures which are low in content of the meta isomers for the production of satisfactory moulding compositions. The use of such low grade materials has not hitherto been possible as resins produced therefrom have not been sufficiently reactive.

Our invention is further illustrated by the following examples, but it is to be understood that our invention is in no way limited by these examples.

EXAMPLE I

Several moulding compositions were made from a phenol-formaldehyde resin (prepared from commercial phenol) by compounding together on hot rolls the ingredients shown in Table 1. The moulding properties of the resulting compositions are shown in the table. The properties given are (a) cup flow (as determined by the method of B. S. S. 771), (b) cup cure (minimum time to produce a blister-free moulding in the B. S. S. 771 cup flow test, the time being measured from the moment the mould is completely closed to the moment when the mould is opened), (c) the case of extraction of the moulding from the mould and (d) the "case of deformation" of the hot moulding immediately on removal from the mould.

*Note.*—The "case of deformation" is an arbitrary measure of the hot strength of the moulding and is determined by the following method. The hot cup is taken straight from the mould and placed immediately on its side in an apparatus containing a suitably shaped depression such that the cup lies with its axis of symmetry in a horizontal plane. A loaded plunger (total load 10.5 lbs.) is then lowered on to the upper surface of the cup near the open end, the plunger being constructed of a semi-circular piece of $\frac{1}{16}$ in. thick mild steel plate, having a radius of curvature of 3/8". The point of contact of the plunger is 3/4" from the open end of the cup and vertically above the central axis. Under this deforming load, the sides of the cup are partially squeezed together. The decrease in diameter of the open end, calculated as a percentage of the original diameter, is termed the "case of deformation."

*Table 1*

|  | Parts by weight | | | |
|---|---|---|---|---|
| Phenol-formaldehyde novolac | 40.0 | 40.0 | 40.0 | 40.0 |
| Woodflour | 40.0 | 49.0 | 49.0 | 49.0 |
| Hexamethylene tetramine | 5.0 | 5.0 | 5.0 | 5.0 |
| Calcium hydroxide | 3.0 | 3.0 | 1.0 | 1.0 |
| Stearic acid | 1.5 | 1.5 | 1.5 | 1.5 |
| Nigrosine | 1.5 | 1.5 | 1.5 | 1.5 |
| Boric acid | | 3.0 | 3.0 | |
| Total | 100 | 103.0 | 101.0 | 98.0 |
| Cup flow (secs) | 13 | 10 | 8 | 10 |
| Cup cure (secs) | 60 | 55 | 45 | 55 |
| Ease of extraction | Fair | Perfect | Perfect | Sticks |
| Ease of deformation (after 60 secs. cure) | 18.75 | 18.75 | 6.25 | 43.75 |

EXAMPLE II

Several moulding compositions were made from a cresol-formaldehyde resin by compounding together on hot rolls the ingredients shown in Table 2. The cresol-formaldehyde novolac was made from commercial cresylic acid containing 52% of meta-cresol. The moulding properties of the compositions are shown in Table 2.

*Table 2*

|  | Parts by weight | | | | | |
|---|---|---|---|---|---|---|
| Cresol-formaldehyde novolac | 40.0 | 40.0 | 40.0 | 40.0 | 40.0 | 40.0 |
| Woodflour | 49.0 | 49.0 | 49.0 | 49.0 | 49.0 | 49.0 |
| Hexamethylene tetramine | 5.0 | 5.0 | 5.0 | 5.0 | 5.0 | 5.0 |
| Magnesia | 1.0 | 1.0 | 1.0 | 2.0 | 1.0 | 1.0 |
| Stearic acid | 1.5 | 1.5 | 1.5 | 1.5 | 1.5 | 1.5 |
| Nigrosine | 1.5 | 1.5 | 1.5 | 1.5 | 1.5 | 1.5 |
| Boric acid | | 1.0 | 3.0 | 5.0 | 5.0 | 10.0 |
| Total | 98.0 | 99.0 | 101.0 | 104.0 | 103.0 | 108.0 |
| Cup flow (secs) | 16 | 12 | 12 | 12 | 15 | 15 |
| Cup cure (secs) | 70–75 | 60 | 55 | 55 | 50 | 50 |
| Ease of extraction | Poor | Good | Perfect | Perfect | Perfect | (¹) |
| Ease of deformation (after 75 secs. cure) | 81.25 | 50 | 12.5 | 12.5 | 8 | 8 |

¹ Good initially, deteriorates with subsequent mouldings because of mould poisoning.

EXAMPLE III

The moulding compositions shown in Table 3 were made using a resin prepared from a mixture of phenol with commercial mixtures of cresols and xylenols. The mixture consisted of 60 parts of phenol, 20 parts of commercial cresylic acid containing 52% of the meta-cresol and 20 parts of a a commercial xylenol fraction containing approximately 4% of phenol, 14% ortho-cresol, 12% meta-cresol, 16% para-cresol, 20% of 2.4/2.5 xylenol, and 10% of 3.5 xylenol, together with other xylenols and higher boiling materials.

Table 3

|  | Parts by weight | |
| --- | --- | --- |
| Phenol-cresol-xylenol novolac | 40.0 | 40.0 |
| Woodflour | 49.0 | 49.0 |
| Hexamethylene tetramine | 5.0 | 5.0 |
| Magnesia | 3.0 | 1.0 |
| Stearic acid |  | 1.5 |
| Nigrosine | 1.5 | 1.5 |
| Boric acid | 1.5 | 1.5 |
|  |  | 3.0 |
| Total | 100.0 | 101.0 |
| Cup flow (secs) | 15 | 13 |
| Cup cure (secs) | 80 | 60 |
| Ease of extraction | Fair | Good |
| Ease of deformation (after 65 secs. cure) | 40 | 9 |

We claim:

1. A process for the production of a thermosetting molding composition containing a novolac and capable of being cured by heat and pressure to an infusible, insoluble product having as the resin component a two-stage phenol-formaldehyde resin which comprises intimately admixing a novolac, hexamethylene tetramine and from 0.1% to 15% of a boric acid by weight of the resin of the molding composition, and an alkaline substance selected from the group consisting of lime and magnesia in an amount sufficient to reduce the tendency of the subsequently molded article to stick to the mold, but not in excess of 6% by weight of the resin of the molding composition.

2. A process as set forth in claim 1 wherein the boric acid is orthoboric acid.

3. A process as set forth in claim 1 wherein the boric acid is intimately admixed with the composition during the blending of the novolac and the hexamethylene tetramine.

4. A process for the production of a thermosetting molding composition containing a novolac capable of being cured by heat and pressure to an infusible, insoluble product having as the resin component a two-stage phenol-formaldehyde resin which comprises intimately admixing a novolac and hexamethylene tetramine with 2% of a substance selected from the alkali group consisting of lime and magnesia and 6% of a boric acid, both percentages being by weight of the resin of the molding composition.

5. A thermosetting molding composition containing a novolac and capable of being cured by heat and pressure to an infusible, insoluble product having as the resin component a two-stage phenol-formaldehyde resin which comprises an intimate admixture of a novolac, hexamethylene tetramine, and from 0.1% to 15% of a boric acid by weight of the resin of the molding composition, and an alkaline substance selected from the group consisting of lime and magnesia in an amount sufficient to reduce the tendency of the subsequently molded article to stick to the mold, but not in excess of 6% by weight of the resin of the molding composition.

6. A thermosetting molding composition containing a novolac and capable of being cured by heat and pressure to an infusible, insoluble product having as the resin component a two-stage phenol-formaldehyde resin which comprises an intimate admixture of a novolac, hexamethylene tetramine, 0.1% to 15% of a boric acid, and from 2% to 6% of a substance selected from the alkalies consisting of lime and magnesia, both percentages being by weight of the resin of the molding composition.

7. A process for the production of a thermosetting molding composition containing a novolac and capable of being cured by heat and pressure to an infusible, insoluble product having as the resin component a two-stage phenol-formaldehyde resin which comprises intimately admixing a novolac, hexamethylene tetramine, from 0.1% to 15% of a boric acid, and from 2% to 6% of an alkaline substance selected from the group consisting of lime and magnesia, both percentages being by weight of the resin of the molding composition.

JAMES HAROLD WILLIAMS.
TERENCE WARD.

REFERENCES CITED

The following references are of record in the file of this patent:

UNITED STATES PATENTS

| Number | Name | Date |
| --- | --- | --- |
| 1,717,600 | Bender | June 18, 1929 |
| 2,054,053 | Hoffman | Sept. 8, 1936 |
| 2,138,795 | Schmidt | Nov. 29, 1938 |
| 2,156,124 | Novotny | Apr. 25, 1939 |
| 2,363,893 | Monier | Nov. 28, 1944 |

FOREIGN PATENTS

| Number | Country | Date |
| --- | --- | --- |
| 537,367 | Germany | Nov. 2, 1931 |

OTHER REFERENCES

McHutchinson, The Industrial Chemist, October 1934, pages 383–386.

De Bell et al., German Plastics Practice, published by De Bell & Richardson, Springfield, Mass. (1946), pages 236–239.